US009569290B1

United States Patent
Osipov et al.

(10) Patent No.: US 9,569,290 B1
(45) Date of Patent: Feb. 14, 2017

(54) UTILIZING A PROFILE TO PREVENT RECURRING EVENTS FROM BEING TRANSMITTED TO THE EVENT PROCESSING DEVICE THAT ARE NOT NECESSARY TO BE PROCESSED BY EVENT PROCESSING DEVICE

(71) Applicant: International Business Machines Corporation, Armonk, NY (US)

(72) Inventors: Kirill M. Osipov, Ormond Beach, FL (US); Mark W. VanderWiele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/854,917

(22) Filed: Sep. 15, 2015

(51) Int. Cl.
*G06F 1/26* (2006.01)
*G06F 1/32* (2006.01)
*G06F 9/54* (2006.01)

(52) U.S. Cl.
CPC ............. *G06F 9/542* (2013.01); *G06F 1/3262* (2013.01)

(58) Field of Classification Search
CPC ............................... G06F 1/3262; G06F 9/542
USPC .................................................. 713/300, 320
See application file for complete search history.

(56) References Cited

U.S. PATENT DOCUMENTS

| 7,058,824 B2 | 6/2006 | Plante et al. |
| 8,024,480 B2 | 9/2011 | DiStefano |
| 8,208,905 B2 | 6/2012 | Lee et al. |
| 8,352,961 B2 | 1/2013 | Parker et al. |
| 8,615,597 B2 | 12/2013 | Misra et al. |
| 8,751,593 B2 | 6/2014 | Chuan et al. |
| 2003/0131206 A1* | 7/2003 | Atkinson ................. G06F 12/08 711/156 |
| 2004/0049344 A1* | 3/2004 | Simon ..................... G08G 1/161 701/301 |
| 2008/0263093 A1 | 10/2008 | Alcorn et al. |
| 2012/0260251 A1 | 10/2012 | Collins et al. |
| 2014/0025680 A1* | 1/2014 | Moganti ........... G06F 17/30014 707/737 |

(Continued)

FOREIGN PATENT DOCUMENTS

| CN | 102594871 A | 7/2012 |
| CN | 101957927 B | 4/2013 |

(Continued)

*Primary Examiner* — Mark Connolly
(74) *Attorney, Agent, or Firm* — Robert A. Voigt, Jr.; Winstead, P.C.

(57) ABSTRACT

A method, system and computer program product for efficiently utilizing resources in processing recurring events. Recurring events from one or more event type sources (heart rate monitor) sensed by various sensors are detected. An event type (e.g., heart rate data) for each detected recurring event is identified. A user profile associated with the identified event type is then analyzed to determine whether the associated sensed recurring event is to be transmitted to the event processing device. The user profile contains a set of conditions which need to be satisfied before the recurring event is transmitted to the event processing device. If the set of conditions in the user profile is not satisfied, then the recurring event is not transmitted to the event processing device. In this manner, by not transmitting the recurring event, power and consumption utilization are reduced for both the event emitting device and the event processing device.

20 Claims, 6 Drawing Sheets

(56) References Cited

U.S. PATENT DOCUMENTS

2014/0106702 A1  4/2014  Anderson
2014/0279841 A1  9/2014  Varada
2015/0046828 A1  2/2015  Desai et al.

FOREIGN PATENT DOCUMENTS

CN   102170662 B   8/2013
WO    02069300 A1  9/2002

* cited by examiner

UTILIZING A PROFILE TO PREVENT RECURRING EVENTS FROM BEING TRANSMITTED TO THE EVENT PROCESSING DEVICE THAT ARE NOT NECESSARY TO BE PROCESSED BY EVENT PROCESSING DEVICE

TECHNICAL FIELD

The present invention relates generally to event notifications, and more particularly to reducing power and computation utilization on event emitting devices and event processing devices by utilizing a profile to determine whether a recurring event detected by the event emitting device should be sent to the event processing device.

BACKGROUND

Event data, such as event data in high velocity flows of data from real-time sources, such as sensors, often include data from recurring events. "Recurring events," as used herein, refer to events with an identical event type that occur again after an interval of time has elapsed. For example, a recurring event may involve the geolocation data of a user's smartphone, where such data is generated every second.

These recurring events may be detected by a computing device (e.g., smartphone) via a sensor (e.g., wearable sensor) and then transmitted to an event processing device to be processed. After processing the event, a notification of the event is sent to the computing device. For example, geolocation events from the computing device may be transmitted and processed by the event processing device to determine if the computing device entered a location, such as a retail store. Once it is determined that the computing device entered the location, a notification is generated, such as to notify the user of the computing device that a sales promotion is available in the retail location.

However, due to the huge volume of events generated and processed, especially in the era of Internet of Things (IoT), where IoT application architectures rely on recurring event analytics for notifications, a significant amount of computational and power resources are being utilized for detecting and transmitting events as well as for processing events and transmitting notifications.

However, there are situations when it is no longer necessary to transmit a recurring event (e.g., geolocation event) to the event processing device, such as after the user of the computing device has received a sales promotion available at the retail location entered by the user. Unfortunately, such recurring events continue to be transmitted to the event processing device. If, however, such recurring events that are no longer necessary to be transmitted, could be prevented from being transmitted to and processed by the event processing device, then a reduction in network transmission could occur thereby providing a reduction in bandwidth utilization as well as a reduction in the computation and power resources utilized by the computing device and the event processing device.

Unfortunately, there is not currently a means for effectively preventing recurring events that are no longer necessary to be processed by the event processing device from being transmitted to the event processing device.

BRIEF SUMMARY

In one embodiment of the present invention, a method for efficiently utilizing resources in processing recurring events comprises detecting recurring events from one or more event type sources sensed by a plurality of sensors, where the recurring events are events that occur again after an interval of time has elapsed. The method further comprises identifying, by a processor, an event type for each detected recurring event. The method additionally comprises analyzing, by the processor, a user profile associated with the identified event type to determine whether associated sensed recurring event is to be transmitted to an event processing device, where the user profile comprises a set of conditions which need to be satisfied before a recurring event is transmitted to the event processing device. Furthermore, the method comprises transmitting the recurring event to the event processing device in response to satisfying the set of conditions.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for efficiently utilizing resources in processing recurring events. In one embodiment of the present invention, recurring events from one or more event type sources (e.g., global positioning system, heart rate monitor, smart thermostat system, appliance) sensed by various sensors are detected. An event type (e.g., heart rate data) for each detected recurring event is identified. A user profile associated with the identified event type is then analyzed to determine whether the associated sensed recurring event (heart rate) is to be transmitted to the event processing device. A "user profile," as discussed herein, refers to a profile containing a set of conditions which need to be satisfied before the recurring event is transmitted to the event processing device. Such conditions may be based on frequency, location and/or velocity. If the set of conditions in the user profile is not satisfied, then the recurring event is not transmitted to the event processing device. In this manner, by not further transmitting the recurring event, power and consumption utilization are reduced for both the event emitting device and the event processing device. Furthermore, there is a reduction in network transmission thereby providing a reduction in bandwidth utilization.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
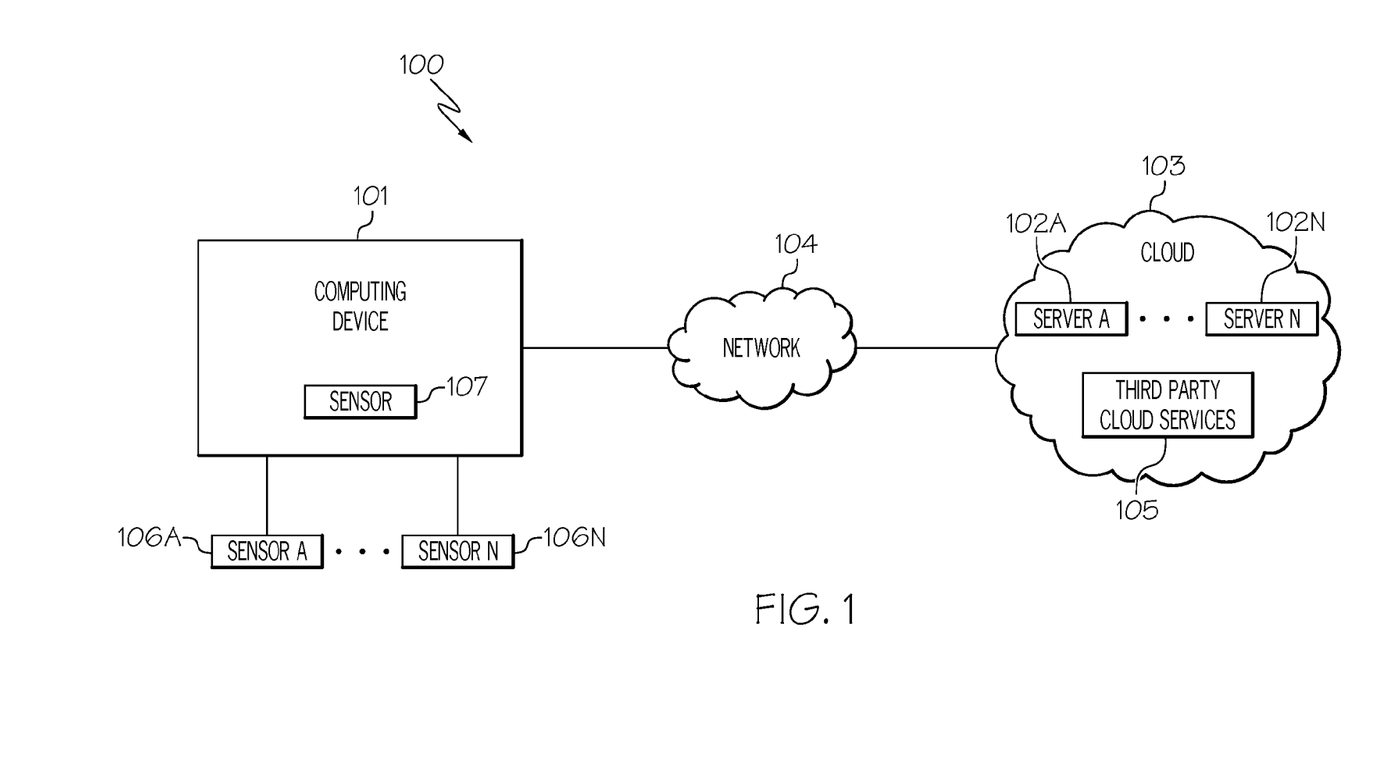
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes a computing device 101 (also referred to herein as the "event emitting device") connected to servers 102A-102N (identified as "server A" . . . "server N" in FIG. 1, respectively) (also referred to herein as the "event processing device") in the "cloud" 103 via network 104. Servers 102A-102N may collectively or individually be referred to as servers 102 or server 102, respectively.

Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 104 and consequently communicating with other computing devices 101 and servers 102. A description of the hardware configuration of computing device 101 is provided below in connection with FIG. 2. A description of the hardware configuration of server 102 is provided further below in connection with FIG. 3.

Cloud 103, as used herein, includes the feature of automatic scalability, whereby servers 102 may be provisioned and de-provisioned on demand. Furthermore, cloud 103 includes the feature of being associated with a policy, where a policy consists of a set of objectives. For example, an objective could be financial, such as having a budget that does not exceed a particular cost, such as a monthly cost. In another example, an objective could focus on the utilization of resources, such as the utilization of memory, processing capacity or number of servers 102. Additionally, cloud 103 includes the feature of integration with third party cloud services 105. For example, in the scenario in determining whether to issue a notification to the user of computing device 101 regarding a sales promotion after the user crosses the geo-fence of a retail store, servers 102 may utilize information from third party cloud services 105 to determine if such a sales promotion is available.

Computing device 101 may be configured to detect recurring events of various event types that were sensed by sensors 106A-106N (identified as "sensor A" . . . "sensor N" in FIG. 1, respectively) and sensor 107. Sensors 106A-106N may collectively or individually be referred to as sensors 106 or sensor 106, respectively. A "recurring event," as used herein, refers to an event with an identical event type that occurs again after an interval of time has elapsed. These recurring events can be of various event types from various event sources, such as a heart rate monitor, a global positioning system, a smart thermostat system and an appliance. Such events may be detected by sensors embedded within computing device 101, such as shown by sensor 107, or external to computing device 101, such as shown by sensors 106. For example, the user of computing device 101 may be wearing a wearable device (not shown in FIG. 1) with a sensor (e.g., sensor 106) that senses the heart rate of the user. While FIG. 1 illustrates a single sensor (e.g., sensor 107) embedded within computing device 101, computing device 101 may contain any number of embedded sensors 107. Furthermore, computing device 101 may be connected to any number of external sensors 106.

In one embodiment, sensors 106, 107 have various power management states, such as an off state (sensor 106, 107 does not generate any power), a lower power management state and a maximum power management state. As discussed further herein, the state or mode of operation of sensor 106, 107 may be modified based on the notification received from the event processing device (e.g., server 102) thereby conserving power in situations where it is no longer necessary for sensor 106, 107 to be sensing or operating at such a high capacity.

As discussed in further detail below, upon detecting a recurring event, computing device 101 identifies the event type of the detected recurring event and determines whether the detected recurring event should be transmitted to an event processing device, such as shown in FIG. 1 as server 102 in cloud 103, based on a "user profile" associated with the identified event type. The "user profile," as used herein, refers to a profile containing a set of conditions which need to be satisfied before the recurring event is transmitted to the event processing device. In one embodiment, such a user profile is stored in a data storage unit (e.g., memory, such as memory 206 of FIG. 2, auxiliary storage device, such as disk unit 208 of FIG. 2) of computing device 101. Furthermore, while FIG. 1 illustrates server 102 in cloud 103 as corresponding to an "event processing device," the event processing device may correspond to any computing device with an analytics application using cloud resources to process events. A person of ordinary skill in the art would be capable of applying the principles of the present invention to such implementations. Further, embodiments applying the principles of the present invention to such implementations would fall within the scope of the present invention.

System 100 is not to be limited in scope to any one particular network architecture. System 100 may include any number of computing devices 101, servers 102, clouds 103, networks 104, third party cloud services 105 and sensors 106, 107.

Figure 2:
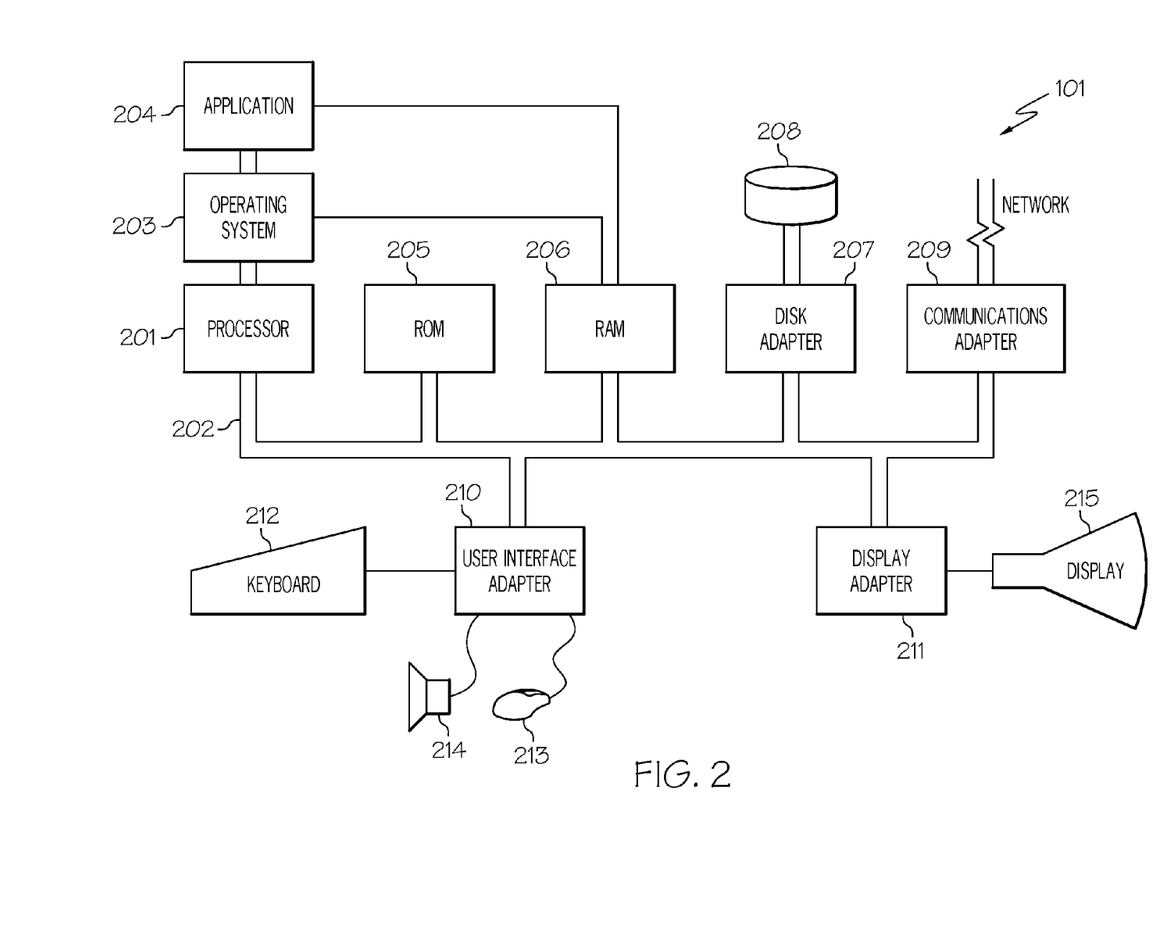
FIG. 2 illustrates a hardware configuration of a computing device in accordance with an embodiment of the present invention.

Referring now to FIG. 2, FIG. 2 illustrates a hardware configuration of computing device 101 (FIG. 1) which is representative of a hardware environment for practicing the present invention. Referring to FIG. 2, computing device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for efficiently utilizing resources in processing recurring events as discussed further below in connection with FIGS. 4-5 and 7.

Referring again to FIG. 2, read-only memory ("ROM") 205 is coupled to system bus 202 and includes a basic input/output system ("BIOS") that controls certain basic functions of computing device 101. Random access memory ("RAM") 206 and disk adapter 207 are also coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive. It is noted that the program for efficiently utilizing resources in processing recurring events, as discussed further below in connection with FIGS. 4-5 and 7, may reside in disk unit 208 or in application 204.

Computing device 101 may further include a communications adapter 209 coupled to bus 202. Communications adapter 209 interconnects bus 202 with an outside network (e.g., network 104 of FIG. 1) thereby enabling computing device 101 to communicate with other devices (e.g., server 102).

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214. Other input mechanisms may be used to input data to computing device 101 that are not shown in FIG. 2, such as display 215 having touch-screen capability and keyboard 212 being a virtual keyboard. Computing device 101 of FIG. 2 is not to be limited in scope to the elements depicted in FIG. 2 and may include fewer or additional elements than depicted in FIG. 2.

Figure 3:
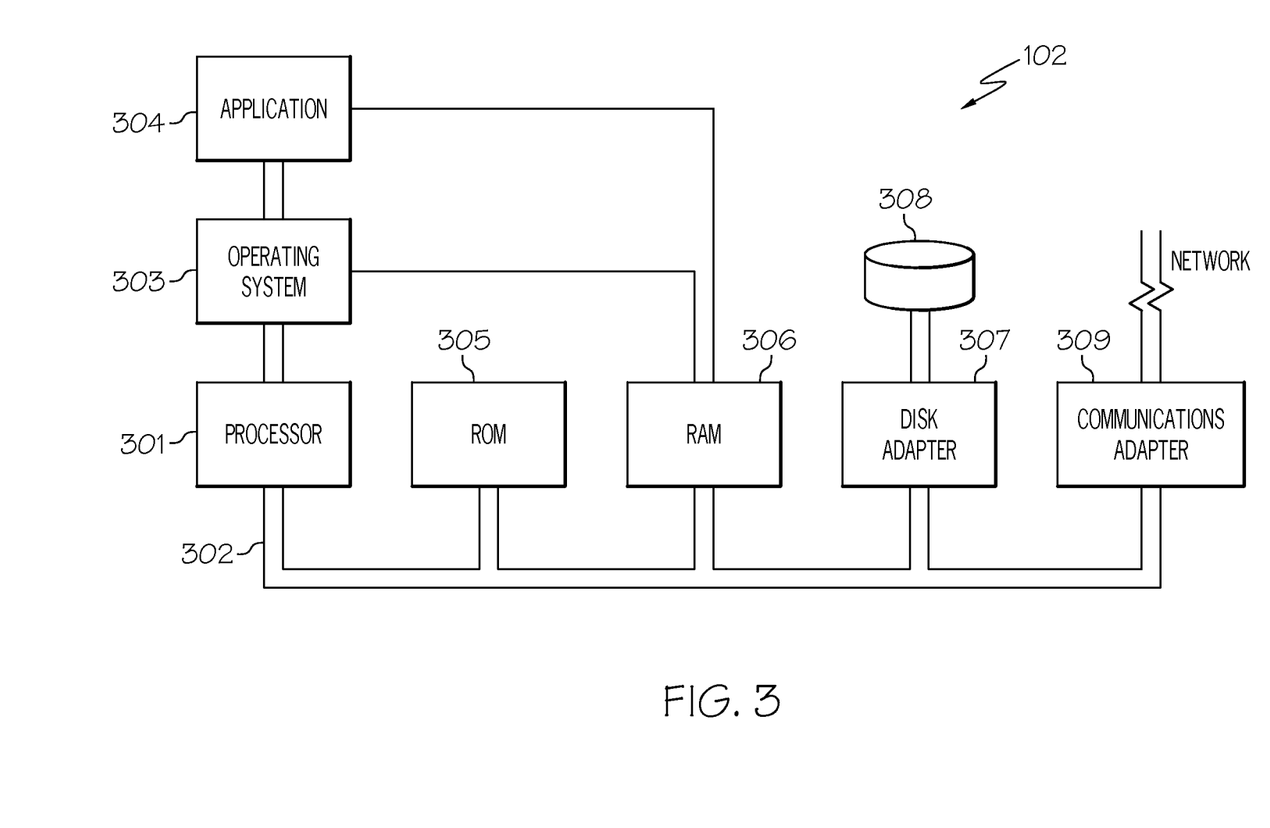
FIG. 3 illustrates a hardware configuration of a server in accordance with an embodiment of the present invention.

Referring now to FIG. 3, FIG. 3 illustrates a hardware configuration of server 102 (FIG. 1) which is representative of a hardware environment for practicing the present invention. Referring to FIG. 3, server 102 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for processing recurring events as discussed further below in connection with FIGS. 4 and 6.

Referring again to FIG. 3, read-only memory ("ROM") 305 is coupled to system bus 302 and includes a basic input/output system ("BIOS") that controls certain basic functions of server 102. Random access memory ("RAM") 306 and disk adapter 307 are also coupled to system bus 302. It should be noted that software components including operating system 303 and application 304 may be loaded into RAM 306, which may be server's 102 main memory for execution. Disk adapter 307 may be an integrated drive electronics ("IDE") adapter that communicates with a disk unit 308, e.g., disk drive. It is noted that the program for processing recurring events, as discussed further below in connection with FIGS. 4 and 6, may reside in disk unit 308 or in application 304.

Server 102 may further include a communications adapter 309 coupled to bus 302. Communications adapter 309 interconnects bus 302 with an outside network (e.g., network 104 of FIG. 1) thereby enabling server 102 to communicate with other devices, such as computing device 101 of FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, recurring events may be detected by a computing device (e.g., smartphone) via a sensor (e.g., wearable sensor) and then transmitted to an event processing device to be processed. After processing the event, a notification of the event is sent to the computing device. For example, geolocation events from the computing device may be transmitted and processed by the event processing device to determine if the computing device entered a location, such as a retail store. Once it is determined that the computing device entered the location, a notification is generated, such as to notify the user of the computing device that a sales promotion is available in the retail location. However, due to the huge volume of events generated and processed, especially in the era of Internet of Things (IoT), where IoT application architectures rely on recurring event analytics for notifications, a significant amount of computational and power resources are being utilized for detecting and transmitting events as well as for processing events and transmitting notifications. However, there are situations when it is no longer necessary to transmit a recurring event (e.g., geolocation event) to the event processing device, such as after the user of the computing device has received a sales promotion available at the retail location entered by the user. Unfortunately, such recurring events continue to be transmitted to the event processing device. If, however, such recurring events that are no longer necessary to be transmitted, could be prevented from being transmitted to and processed by the event processing device, then a reduction in network transmission could occur thereby providing a reduction in bandwidth utilization as well as a reduction in the computation and power resources utilized by the computing device and the event processing device. Unfortunately, there is not currently a means for effectively preventing recurring events that are no longer necessary to be processed by the event processing device from being transmitted to the event processing device.

Figure 4:
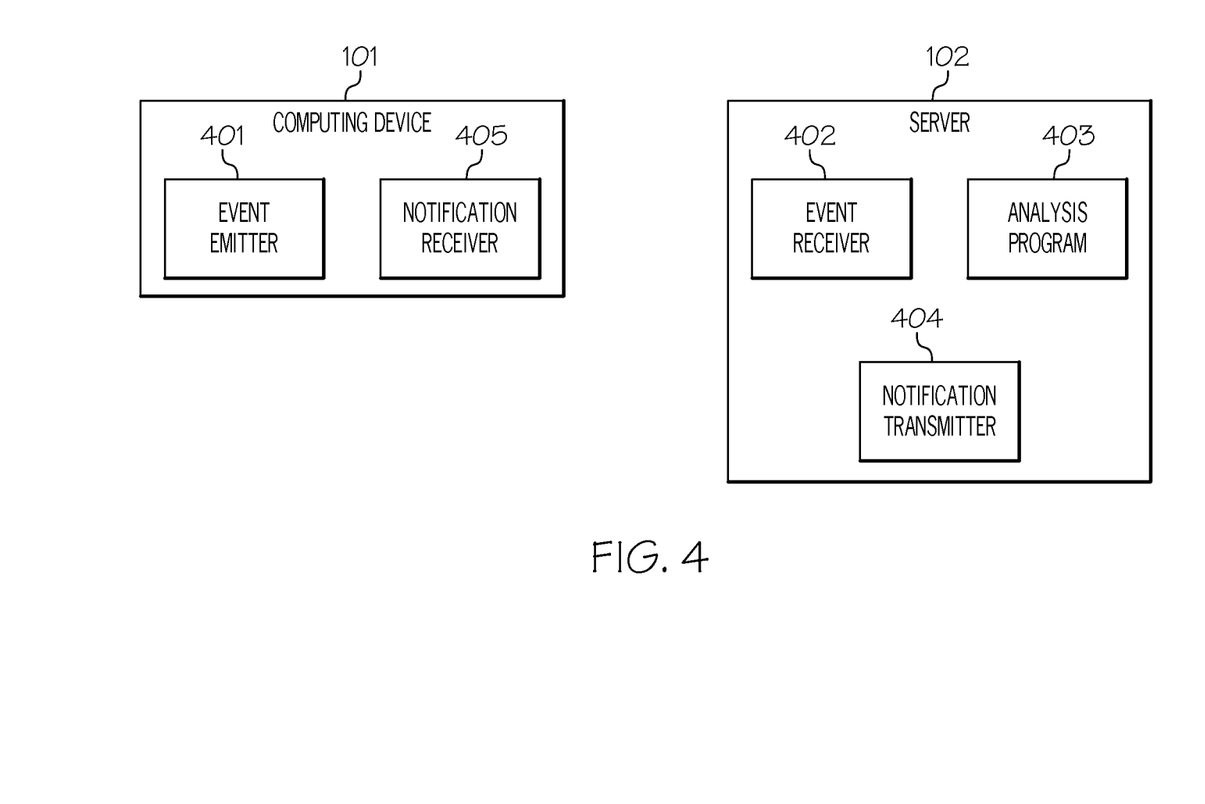
FIG. 4 is a diagram of the software components in the computing device and the server used to process recurring events in accordance with an embodiment of the present invention.
Figure 5:
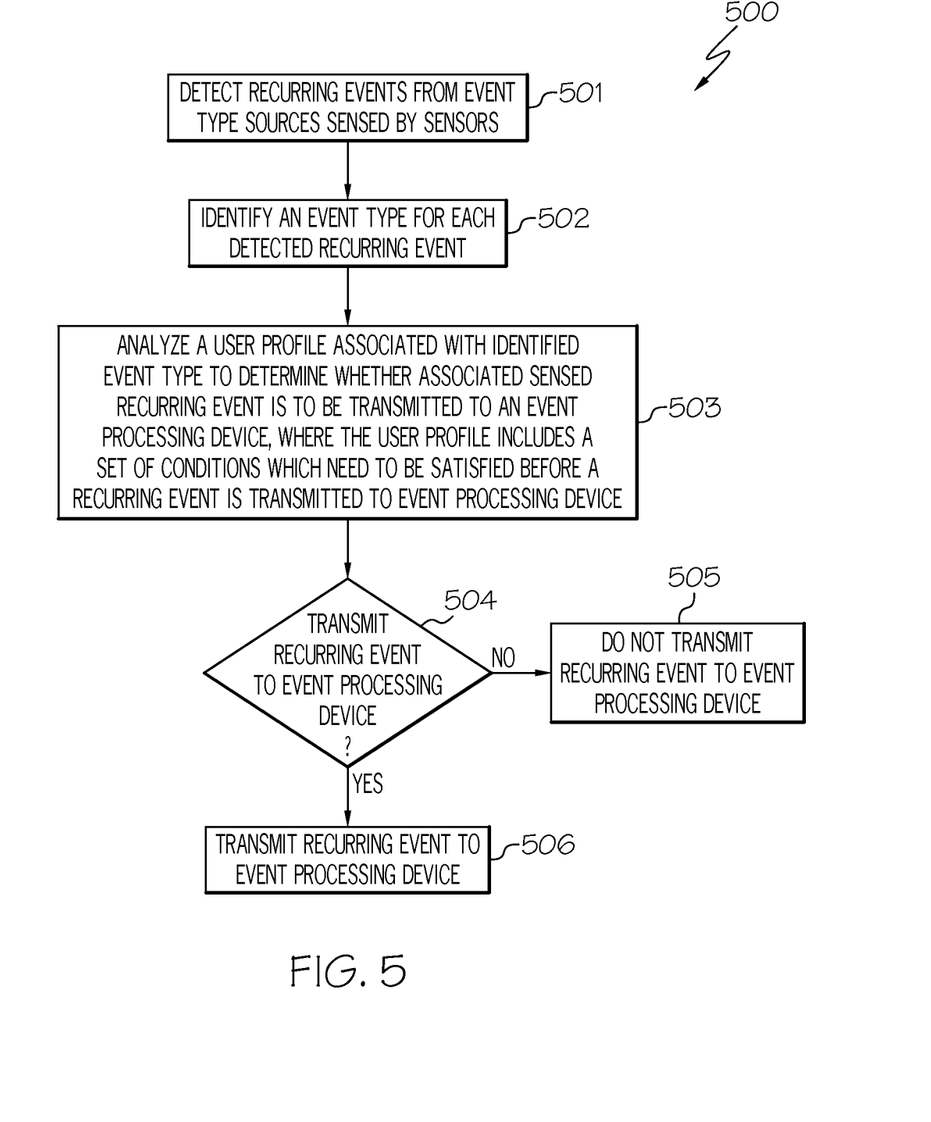
FIG. 5 is a flowchart of a method for efficiently utilizing resources in processing recurring events by preventing recurring events that are no longer necessary to be processed by the event processing device from being transmitted to the event processing device by the computing device in accordance with an embodiment of the present invention.
Figure 6:
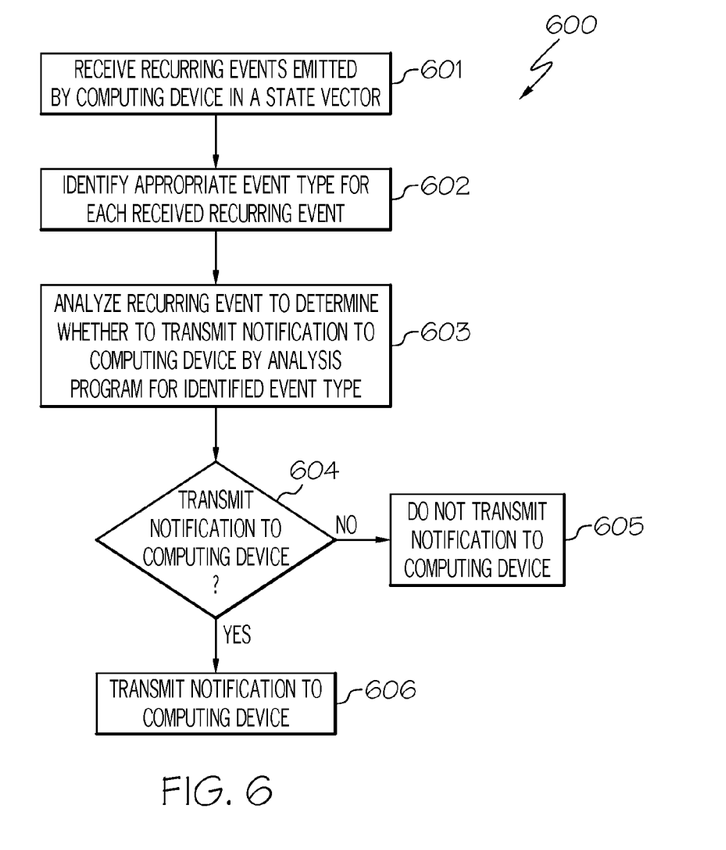
FIG. 6 is a flowchart of a method for generating and transmitting a notification to the computing device by the event processing device in accordance with an embodiment of the present invention.
Figure 7:
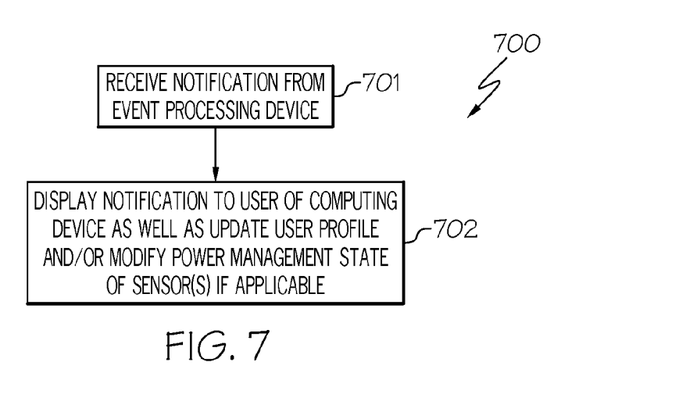
FIG. 7 is a flowchart of a method for handling a notification from the event processing device by the computing device in accordance with an embodiment of the present invention.

The principles of the present invention provide a means for efficiently utilizing resources in processing recurring events by preventing recurring events that are no longer necessary to be processed by the event processing device from being transmitted to the event processing device by using a user profile containing a set of conditions which need to be satisfied before the recurring event is transmitted to the event processing device as discussed below in connection with FIGS. 4-7. FIG. 4 is a diagram of the software components in computing device 101 and server 102 used to process recurring events. FIG. 5 is a flowchart of a method for efficiently utilizing resources in processing recurring events by preventing recurring events that are no longer necessary to be processed by the event processing device (e.g., server 102) from being transmitted to the event processing device by computing device 101. FIG. 6 is a flowchart of a method for generating and transmitting a notification to computing device 101 by the event processing device (e.g., server 102). FIG. 7 is a flowchart of a method for handling a notification from the event processing device (e.g., server 102) by computing device 101.

As stated above, FIG. 4 is a diagram of the software components in computing device 101 (FIGS. 1 and 2) and server 102 (FIGS. 1 and 3) used to process recurring events in accordance with an embodiment of the present invention.

In one embodiment, these software components may reside in application 204 (FIG. 2), application 304 (FIG. 3), respectively.

The following provides a brief description of these software components. A more detailed description of these software components (including their functionalities) is provided below in conjunction with FIGS. 5-7.

Referring to FIG. 4, in conjunction with FIGS. 1-3, computing device 101 includes an event emitter 401 configured to emit recurring events to the event processing device (e.g., server 102) that satisfy the required set of conditions in the user profile associated with the event type of the recurring event. In one embodiment, each event type is associated with a particular user profile. In one embodiment, the set of conditions in the user profile is based on frequency, location, velocity, ambient temperature, skin temperature and/or heart rate. For example, the set of conditions in the user profile may be based on frequency, such as emitting the recurring event to the event processing device (e.g., server 102) at most one time per day. In another example, the recurring event is emitted to the event processing device (e.g., server 102) after a period of time has elapsed. In a further example, the recurring event is emitted to the event processing device (e.g., server 102) on a particular schedule (e.g., particular days and/or times).

An example of the set of conditions in the user profile being based on location include emitting the recurring event to the event processing device (e.g., server 102) only if computing device 101 is within a certain distance of a location (e.g., retail store). An example of the set of conditions in the user profile being based on velocity include emitting the recurring event to the event processing device (e.g., server 102) only when computing device 101 is moving at a particular speed, such as to a designated location.

If event emitter 401 determines that the recurring event is to be emitted to the event processing device (e.g., server 102), then event emitter 401 emits the recurring event to the event processing device (e.g., server 102), which is received by event receiver 402 of server 102.

The received recurring event is then analyzed by a particular analysis program 403 of the event processing device (e.g., server 102) for that event type to determine whether to transmit a notification to computing device 101. If a notification is determined to be transmitted to computing device 101, then notification transmitter 404 transmits a notification to computing device 101, which is received by notification receiver 405 of computing device 101.

A further discussion regarding the functionality of these software components is provided below in conjunction with FIGS. 5-7.

As stated above, FIG. 5 is a flowchart of a method 500 for efficiently utilizing resources in processing recurring events by preventing recurring events that are no longer necessary to be processed by the event processing device (e.g., server 102 of FIG. 1) from being transmitted to the event processing device by computing device 101 (FIG. 1) in accordance with an embodiment of the present invention.

Referring to FIG. 5, in conjunction with FIGS. 1-4, in step 501, event emitter 401 of computing device 101 detects recurring events from one or more event type sources (e.g., global positioning system, heart rate monitor, smart thermostat system, appliance) sensed by sensors 106, 107.

In step 502, event emitter 401 of computing device 101 identifies an event type for each detected recurring event. Examples of an event type include heart rate data, geolocation data, temperature data, etc.

In step 503, event emitter 401 of computing device 101 analyzes a user profile associated with the identified event type (e.g., heart rate data) to determine whether the associated sensed recurring event (heart rate) is to be transmitted to the event processing device (e.g., server 102). In one embodiment, each event type is associated with a particular user profile. As discussed above, a "user profile" refers to a profile containing a set of conditions which need to be satisfied before the recurring event is transmitted to the event processing device (e.g., server 102). Such conditions may be based on frequency, location, velocity, ambient temperature, skin temperature and/or heart rate as discussed above.

For example, the user profile may include conditions based on frequency, such as emitting the recurring event to the event processing device (e.g., server 102) at most one time per day. In such a scenario, event emitter 401 determines whether the recurring event has already been emitted to the event processing device. For instance, once the user of computing device 101 crossed a geo-fence in a retail store, it may no longer be necessary for computing device 101 to transmit geolocation coordinates to the event processing device. The event processing device has already determined whether the user of computing device 101 is eligible to be notified of the retailer's sales promotion once computing device 101 has crossed that geo-fence. As a result of not further transmitting the recurring event, including the data associated with the recurring event (e.g., geolocation coordinates), power and consumption utilization are reduced for both the event emitting device (e.g., computing device 101) and the event processing device (e.g., server 102). Furthermore, there is a reduction in network transmission thereby providing a reduction in bandwidth utilization.

In step 504, a determination is made by event emitter 401 of computing device 101 as to whether to transmit the recurring event to the event processing device (e.g., server 102) based on the analysis of step 503 (i.e., based on whether the set of conditions in the appropriate user profile is satisfied).

If the set of conditions in the user profile is not satisfied, then, in step 505, event emitter 401 does not transmit the recurring event to the event processing device (e.g., server 102).

If, however, the set of conditions in the user profile is satisfied, then, in step 506, event emitter 401 of computing device 101 transmits the recurring event to the event processing device (e.g., server 102). "Transmitting the recurring event," as used herein, includes both the indication of the recurring event (e.g., checked heart rate again) as well as the data associated with the event (e.g., heart rate data).

In one embodiment, computing device 101 transmits multiple recurring events in a state vector to the event processing device (e.g., server 102) in order to conserve resources. For example, computing device 101 may transmit multiple recurring events in a state vector to the event processing device (e.g., server 102) in response to satisfying the conditions in the user profile(s) associated with the event type(s) of the recurring events. The state vector of recurring events is then evaluated by the event processing device (e.g., server 102) as discussed below in connection with FIG. 6.

FIG. 6 is a flowchart of a method 600 for generating and transmitting a notification to computing device 101 by the event processing device (e.g., server 102) in accordance with an embodiment of the present invention.

Referring to FIG. 6, in conjunction with FIGS. 1-4, in step 601, event receiver 402 of the event processing device (e.g., server 102) receives the recurring events emitted by computing device 101 in a state vector as discussed above.

In step 602, event receiver 402 of the event processing device (e.g., server 102) identifies the appropriate event type (e.g., heart rate data) for each received recurring event (checked heart rate again).

In step 603, a particular analysis program 403 of the event processing device (e.g., server 102) associated with the identified event type will be used to analyze the recurring event to determine whether to transmit the notification to computing device 101. For instance, analysis program 403 may determine whether to notify the user of computing device 101 regarding the recurring event based on analyzing the data (e.g., geolocation data, heart rate data, temperature data) to determine whether certain conditions (e.g., location of computing device 101 exceeds a distance of five feet of retailer, heart beat exceeds 130 beats per minute, temperature of refrigerator is less than 32° F. or is greater than 40° F.) are satisfied. Such conditions may be stored in a profile, such as the user profile discussed herein. Furthermore, such conditions may be frequency-based, location-based, velocity-based and/or temperature-based as discussed above in connection with the user profile. In one embodiment, such a profile is stored in the data storage unit (e.g., memory, such as memory 306, auxiliary storage device, such as disk unit 308) of the event processing device (e.g., server 102). For instance, if the profile included a condition whereby a notification is sent concerning a heart rate if the heart rate exceeds 130 beats per minute, then if the event processing device (e.g., server 102) received heart rate data that indicated a heart rate of 132 beats per minute, notification transmitter 404 of the event processing device will transmit a notification to the user of computing device 101.

Furthermore, analysis program 403 of the event processing device (e.g., server 102) may utilize data existing in cloud 103, such as historical data about the user and/or sensors 106, 107, in determining whether to issue a notification to computing device 101. Additionally, analysis program 403 of the event processing device may utilize information from third party cloud services 105 to determine whether to issue a notification to computing device 101. For example, analysis program 403 may determine if a sales promotion is available to be sent to the user of computing device 101 after the user crosses the geo-fence at the retail store. Furthermore, analysis program 403 of the event processing device may utilize applicable policies (set of objectives) to determine whether to issue a notification to computing device 101. For example, if the policy is directed to a financial objective of having a budget that does not exceed a particular monthly cost, then such an objective needs to be taken into consideration as to whether to transmit a notification to computing device 101.

Hence, analysis program 403 of the event processing device (e.g., server 102) may utilize the conditions stored in a profile, historical data existing in cloud 103, third party cloud services 105 and/or policies to determine whether to transmit a notification to computing device 101.

In step 604, a determination is made by notification transmitter 404 of the event processing device as whether to transmit the notification to computing device 101 based on the analysis discussed above in connection with step 603.

If a notification is determined to not be transmitted to computing device 101, such as based on not satisfying the conditions in the profile, historical data existing in cloud 103, information from third party cloud services 105 and/or policies, then, in step 605, notification transmitter 404 does not transmit a notification to computing device 101.

If, however, a notification is determined to be transmitted to computing device 101, such as based on satisfying the conditions in the profile, historical data existing in cloud 103, information from third party cloud services 105 and/or policies, then, in step 606, notification transmitter 404 transmits a notification to computing device 101.

The notification is then received and handled by computing device 101 as discussed below in connection with FIG. 7.

FIG. 7 is a flowchart of a method 700 for handling a notification from the event processing device (e.g., server 102 of FIGS. 1 and 3) by computing device 101 (FIGS. 1 and 2) in accordance with an embodiment of the present invention.

Referring to FIG. 7, in conjunction with FIGS. 1-4, in step 701, notification receiver 405 of computing device 101 receives a notification from the event processing device (e.g., server 102) as discussed above.

In step 702, notification receiver 405 of computing device 101 displays the notification to the user of computing device 101, such as on display 215. Furthermore, notification receiver 405 of computing device 101 may modify the power management state of sensor 106, 107 in situations where it is no longer necessary for sensor 106, 107 to be operating at such a high level of operation to conserve power. For instance, after computing device 101 receives a sales promotion for crossing the geo-fence at a retail store, it is no longer necessary for sensor 106, 107 to send geolocation data to the event processing device (e.g., server 102). As a result, the power management state of sensor 106, 107 may be modified to a state where less power is utilized since such an event does not need to be sensed. Such a determination may be made based on the user profile. For example, the user profile may indicate that such a particular event is only to be transmitted to the event processing device once per day. After transmitting the recurring event to the event processing device and receiving the notification from the event processing device concerning the recurring event, notification receiver 405 may determine to modify the power management state of sensor(s) 106, 107 to a lower level of operation (e.g., off state, lower power mode of operation) since the recurring event has already been transmitted to the event processing device.

Additionally, the notification may be utilized by notification receiver 405 to update the user profile, such as the type of data to send the event processing device (e.g., server 102) in the future.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for efficiently utilizing resources in processing recurring events, the method comprising:

detecting recurring events from one or more event type sources sensed by a plurality of sensors, wherein said recurring events are events that occur again after an interval of time has elapsed;

identifying, by a processor, an event type for each detected recurring event;

analyzing, by said processor, a user profile associated with said identified event type to determine whether associated sensed recurring event is to be transmitted to an event processing device, wherein said user profile comprises a set of conditions which need to be satisfied before a recurring event is transmitted to said event processing device; and transmitting said recurring event to said event processing device in response to satisfying said set of conditions.

2. The method as recited in claim 1, wherein said set of conditions is based on one or more of the following: frequency, location, velocity, ambient temperature, skin temperature and heart rate.

3. The method as recited in claim 1 further comprising:

not transmitting said recurring event to said event processing device in response to not satisfying said set of conditions.

4. The method as recited in claim 1 further comprising:

transmitting a plurality of recurring events in a state vector to said event processing device in response to satisfying said set of conditions in one or more user profiles associated with one or more event types of said plurality of recurring events.

5. The method as recited in claim 1, wherein said one or more event type sources comprise one or more of the following: a heart rate monitor, a global positioning system, a smart thermostat system and an appliance.

6. The method as recited in claim 1 further comprising:

receiving a notification from said event processing device;

displaying said notification to a user of a computing device; and updating said user profile and/or modifying a power management state of one or more of said plurality of sensors in response to receiving said notification from said event processing device.

7. The method as recited in claim 1, wherein said plurality of sensors comprises a sensor on a wearable device.

8. A computer program product for efficiently utilizing resources in processing recurring events, the computer program product comprising a computer readable storage medium having program code embodied therewith, the program code comprising the programming instructions for:

detecting recurring events from one or more event type sources sensed by a plurality of sensors, wherein said recurring events are events that occur again after an interval of time has elapsed;

identifying an event type for each detected recurring event;

analyzing a user profile associated with said identified event type to determine whether associated sensed recurring event is to be transmitted to an event processing device, wherein said user profile comprises a set of conditions which need to be satisfied before a recurring event is transmitted to said event processing device; and transmitting said recurring event to said event processing device in response to satisfying said set of conditions.

9. The computer program product as recited in claim 8, wherein said set of conditions is based on one or more of the following: frequency, location, velocity, ambient temperature, skin temperature and heart rate.

10. The computer program product as recited in claim 8, wherein the program code further comprises the programming instructions for:

not transmitting said recurring event to said event processing device in response to not satisfying said set of conditions.

11. The computer program product as recited in claim 8, wherein the program code further comprises the programming instructions for:

transmitting a plurality of recurring events in a state vector to said event processing device in response to satisfying said set of conditions in one or more user profiles associated with one or more event types of said plurality of recurring events.

12. The computer program product as recited in claim 8, wherein said one or more event type sources comprise one or more of the following: a heart rate monitor, a global positioning system, a smart thermostat system and an appliance.

13. The computer program product as recited in claim 8, wherein the program code further comprises the programming instructions for:

receiving a notification from said event processing device;

displaying said notification to a user of a computing device; and updating said user profile and/or modifying a power management state of one or more of said plurality of sensors in response to receiving said notification from said event processing device.

14. The computer program product as recited in claim 8, wherein said plurality of sensors comprises a sensor on a wearable device.

15. A system, comprising:

a memory unit for storing a computer program for efficiently utilizing resources in processing recurring events; and a processor coupled to the memory unit, wherein the processor is configured to execute the program instructions of the computer program comprising:

detecting recurring events from one or more event type sources sensed by a plurality of sensors, wherein said recurring events are events that occur again after an interval of time has elapsed;

identifying an event type for each detected recurring event;

analyzing a user profile associated with said identified event type to determine whether associated sensed recurring event is to be transmitted to an event processing device, wherein said user profile comprises a set of conditions which need to be satisfied before a recurring event is transmitted to said event processing device; and transmitting said recurring event to said event processing device in response to satisfying said set of conditions.

16. The system as recited in claim 15, wherein said set of conditions is based on one or more of the following: frequency, location, velocity, ambient temperature, skin temperature and heart rate.

17. The system as recited in claim 15, wherein the program instructions of the computer program further comprises:

not transmitting said recurring event to said event processing device in response to not satisfying said set of conditions.

18. The system as recited in claim 15, wherein the program instructions of the computer program further comprises:

transmitting a plurality of recurring events in a state vector to said event processing device in response to satisfying said set of conditions in one or more user profiles associated with one or more event types of said plurality of recurring events.

19. The system as recited in claim 15, wherein said one or more event type sources comprise one or more of the following: a heart rate monitor, a global positioning system, a smart thermostat system and an appliance.

20. The system as recited in claim 15, wherein the program instructions of the computer program further comprises:

receiving a notification from said event processing device;

displaying said notification to a user of a computing device; and     updating said user profile and/or modifying a power management state of one or more of said plurality of sensors in response to receiving said notification from said event processing device.

\* \* \* \* \*